(12) United States Patent
Cintas et al.

(10) Patent No.: US 11,436,508 B2
(45) Date of Patent: Sep. 6, 2022

(54) CONTEXTUAL HASHTAG GENERATOR

(71) Applicant: International Business Machines Corporation, Armonk, NY (US)

(72) Inventors: Celia Cintas, Nairobi (KE); Naweed Aghmad Khan, Johannesburg (ZA); Komminist Weldemariam, Nairobi (KE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 702 days.

(21) Appl. No.: 16/426,516

(22) Filed: May 30, 2019

(65) Prior Publication Data

US 2020/0380394 A1 Dec. 3, 2020

(51) Int. Cl.
| | |
|---|---|
| *G06N 20/00* | (2019.01) |
| *G06N 5/04* | (2006.01) |
| *G06F 16/9536* | (2019.01) |
| *G06Q 30/02* | (2012.01) |
| *G06F 16/9537* | (2019.01) |
| *G06F 40/205* | (2020.01) |
| *G06V 10/70* | (2022.01) |
| *H04L 51/52* | (2022.01) |

(52) U.S. Cl.
CPC ......... *G06N 5/046* (2013.01); *G06F 16/9536* (2019.01); *G06F 16/9537* (2019.01); *G06F 40/205* (2020.01); *G06N 20/00* (2019.01); *G06Q 30/0205* (2013.01); *G06V 10/768* (2022.01); *H04L 51/32* (2013.01)

(58) Field of Classification Search
CPC ....... G06F 16/31; G06K 9/6282; G06N 20/00
USPC .............................................................. 704/9
See application file for complete search history.

(56) References Cited

U.S. PATENT DOCUMENTS

| | | | | |
|---|---|---|---|---|
| 9,009,162 | B1* | 4/2015 | Luo | G06F 16/31 |
| | | | | 707/740 |
| 9,026,144 | B2* | 5/2015 | Wuoti | G06Q 30/0261 |
| | | | | 705/14.1 |
| 10,079,792 | B2 | 9/2018 | Anders et al. | |
| 10,235,464 | B2 | 3/2019 | Dhawan et al. | |
| 10,264,081 | B2* | 4/2019 | Guo | H04L 67/306 |
| 10,482,119 | B2* | 11/2019 | Kataria | G06N 7/005 |
| 10,698,945 | B2* | 6/2020 | State | G06F 16/381 |
| 10,834,026 | B2* | 11/2020 | Nagaraja | G06N 5/02 |
| 10,841,257 | B1* | 11/2020 | Bragdon | H04L 51/046 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Susan I McFadden
(74) *Attorney, Agent, or Firm* — Shimon Benjamin, Esq.; McGinn I.P. Law Group, PLLC.

(57) ABSTRACT

A contextual hashtag generation method, system, and computer program product include receiving content from an online source, identifying a set of contextual indicators for the content, determining an entity-desired outcome for the content, and generating a hashtag for the content using the set of contextual indicators while maximizing the entity-desired outcome.

17 Claims, 6 Drawing Sheets

(56) References Cited

OTHER PUBLICATIONS

Park, et al. "Harrison: A Benchmark on Hashtag Recommendation for Real-world Images in Social Networks", School of Electrical Engineering Kaisit South Korea; arXiv:1605.05054V1 [cs.CV] May 17, 2016.

Serena Barakat & Mahesh Chathuranga, "Improving Hashtag Recommendation for Instagram Images by Considering Hashtag Relativity and Sentiment", Business Intelligence, Level: Masters, Dec. 18, 2018.

\* cited by examiner

CONTEXTUAL HASHTAG GENERATOR

BACKGROUND

The present invention relates generally to a contextual hashtag generation method, and more particularly, but not by way of limitation, to a system, method, and computer program product for intelligently generating and managing hashtags for attaching to a post of content item. Hashtags have been around for some time. Hashtags provide a number of advantages for users, businesses, artificial intelligent agents, autonomous agents (e.g., "bot") or robots to drive content (e.g., a post, photo, etc.) popularity, fellowship, improve content (e.g., posts, blogs, etc.) engagement rates, build a community around a business or a user content, etc.

Conventionally, a user or business needs to carefully select hashtags to enhance personal aspects or business related to a social media strategy. A hashtag can be specific to an industry (e.g., build a community, boost authority and credibility of a business, etc.), a location (e.g., to increase search, remove a significant amount of competition, etc.), 'trending' (e.g., to attract people that were previously out of reach, show that you know your audience, etc.), or a custom hashtag (e.g., to drive awareness of a given business, show creativity of a business, etc.). A hashtag can either be supplied by a user/business agent/entity or recommended by a system to a useror a business in a social media platform such as Twitter™, Instagram™, Facebook™, Linkedin™, etc.

However, the user needs to carefully craft or select hashtags based on content/post characteristics and other contextual factors of a user, an artificial intelligence (AI) agent, autonomous agents or a robot. Especially, if the content is new, it is difficult to select an effective hashtag that may potentially bring the intended impact the user or the business wishes for using hashtags. Conventionally, some techniques have been proposed that group, suggest or recommend hashtags while taking into consideration a user's preferences and posting (e.g., tweet, a photo on Instagram™, or Snapchat™, etc.) content. This technique predicts one or more hashtags that will be used in the future by a user or a business on a social media platform, identifies one or more hashtags from a user supplied content (a keyword, a concept or a characteristic of a group of entities) and presents the hashtags to a user. Other conventional techniques include classifying hashtags in micro-blogs using natural language processing (NLP) and managing hashtags that allow a user to review a ranked or unranked list of hashtags that are correlated with an object of interest and to manipulate the list.

SUMMARY

However, the inventors have identified a problem in the art that the art does not consider identifying contextual indicators (e.g., related to geospatial context, style, temporal context, educational context, social context, etc.) for a given content type (e.g., book, video, audio, images), understanding the desired outcome for a user, a group of users or business (e.g., build a community, boost the authority and credibility of a business, etc.) related to the content, and generating hashtags for the given content (e.g., book, video, audio, images) by applying various custom learning algorithms/models according to one or more contextual indicators pertaining to the desired outcome of the user or business. Based on the newly-identified problem, the inventors propose a new solution below.

In an exemplary embodiment, the present invention provides a computer-implemented contextual hashtag generation method, the method including receiving content from an online source, identifying a set of contextual indicators for the content, determining an entity-desired outcome for the content, and generating a hashtag for the content using the set of contextual indicators while maximizing the entity-desired outcome.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
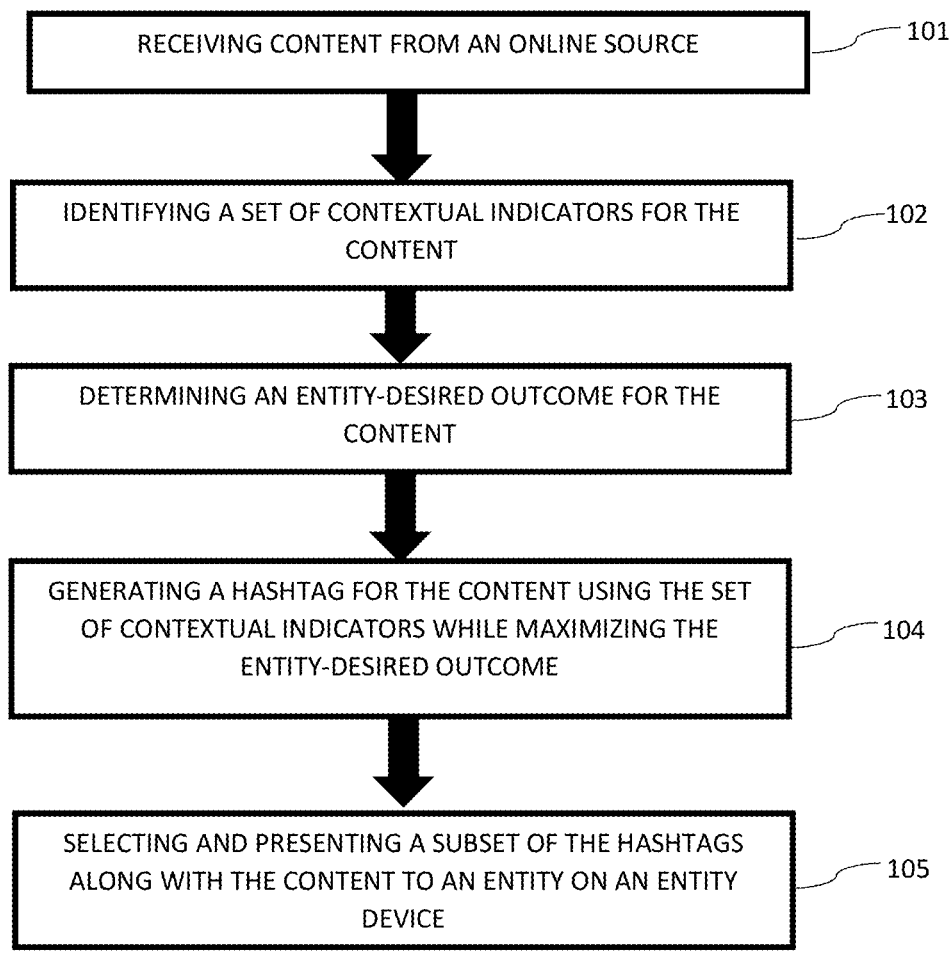
FIG. 1 exemplarily shows a high-level flow chart for contextual hashtag generation method 100 according to an embodiment of the present invention.
Figure 2:
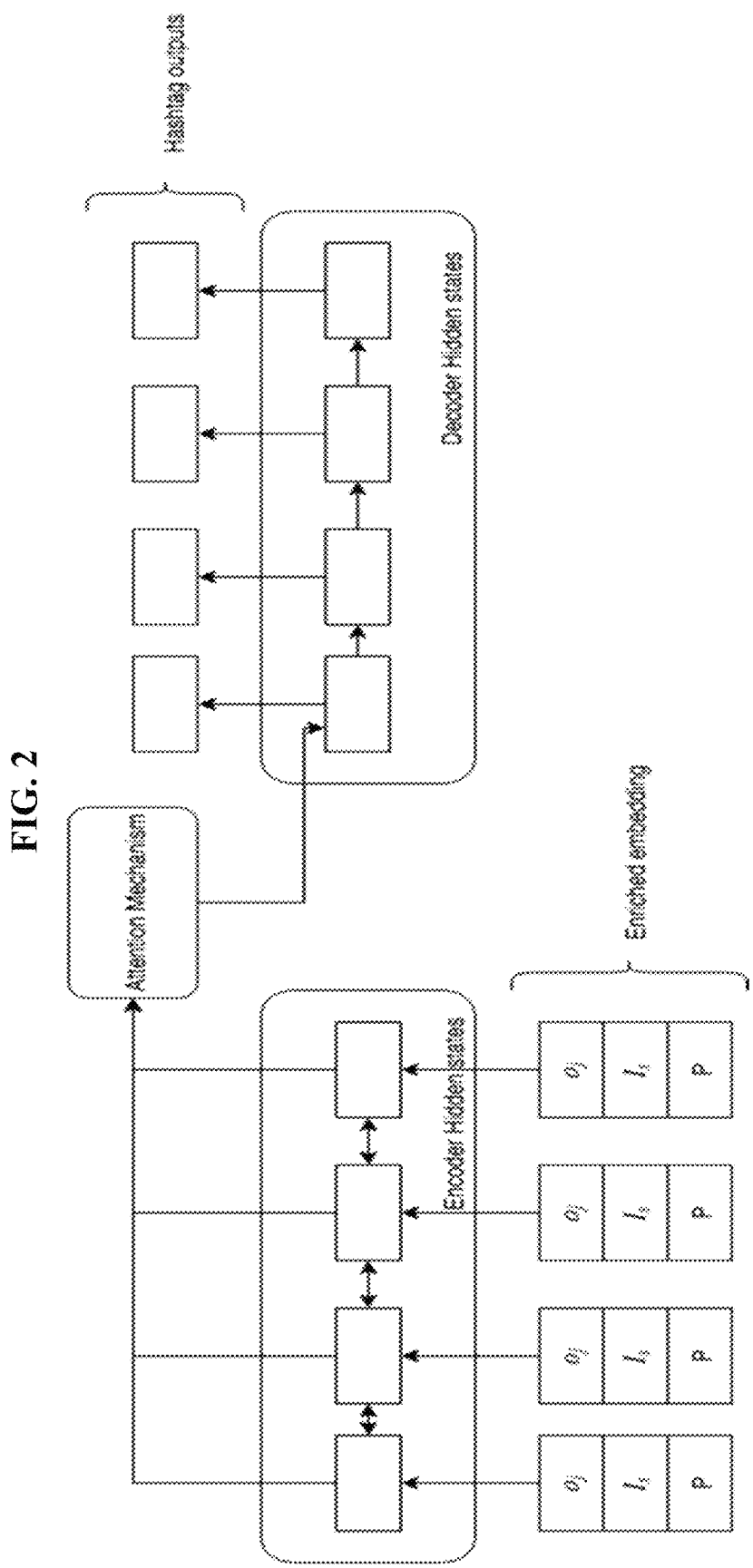
FIG. 2 exemplarily depicts one embodiment for generating a set of hashtags for a given content according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary; the dimensions of the various features can be arbitrarily expanded or reduced for clarity.

By way of introduction of the example depicted in FIG. 1, an embodiment of a contextual hashtag generation method 100 according to the present invention can include various steps for generating and managing contextual hashtags for a given content or cohort of contents for a content from one or more content sources (e.g., a book, a movie, etc.), identifying a set of contextual indicators (e.g., related to geospatial context, style, temporal context, educational context, social context, etc.) for the content, understanding an entity-desired outcome "O" (e.g., build a community, boost authority and credibility of a business) related to the content, generating a set of hashtags for the content using the set of contextual indicators while maximizing the entity-desired outcome "O", and then selecting and presenting a subset of the hashtags along with the content to the entity or a cohort based on analyzing of their profiles.

Figure 4:
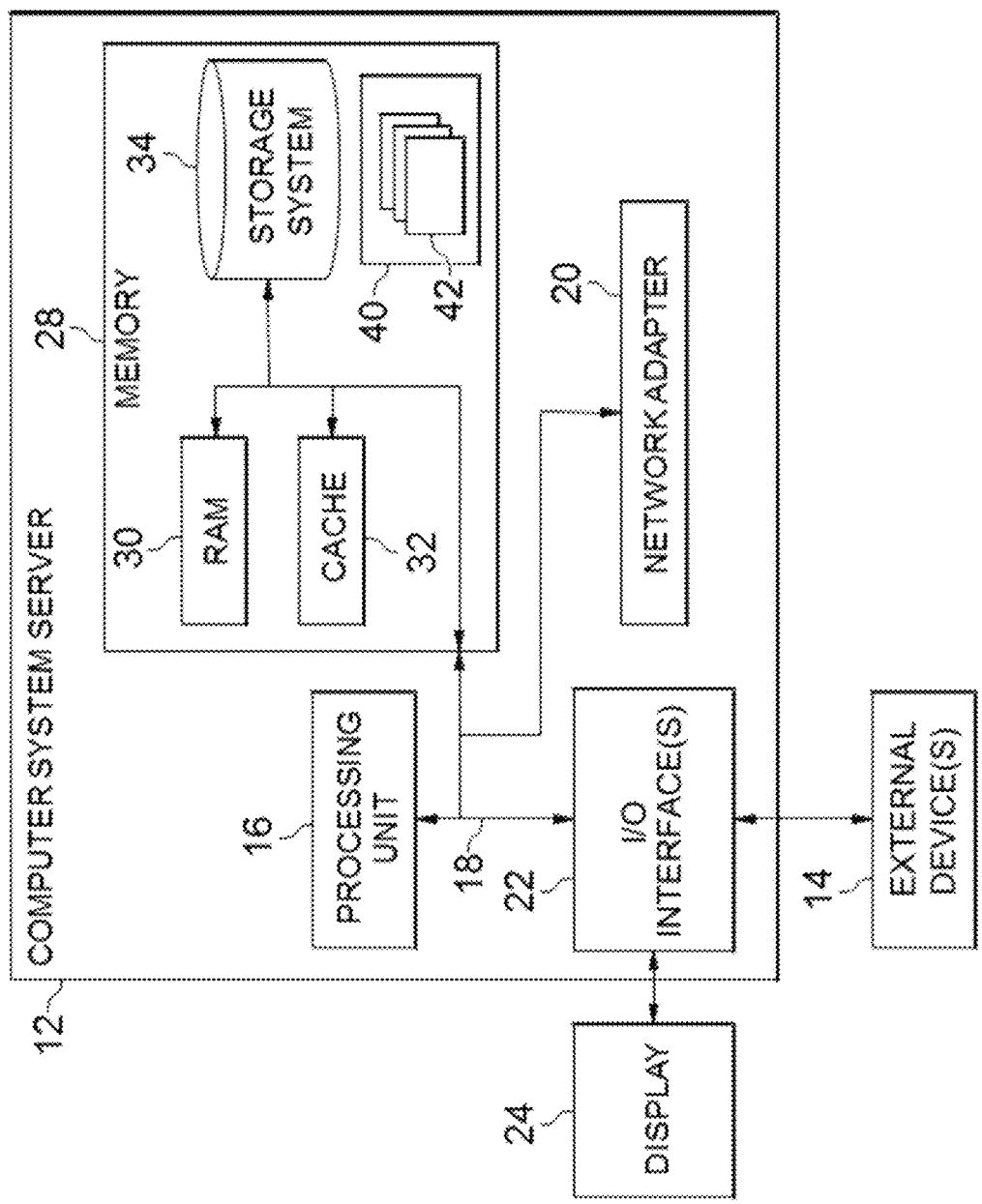
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

It is noted that a "hashtag" may be defined as a type of metadata tag used on social networks such as Twitter™ and other microblogging services, allowing users to apply dynamic, user-generated tagging which makes it possible for others to easily find messages with a specific theme or content. Users create and use hashtags by placing the number sign or pound sign (i.e., "#") usually in front of a word or unspaced phrase in a message. The hashtag may contain letters, digits, and underscores. Searching for that hashtag will yield a set of messages that have been tagged with it. A hashtag archive is consequently collected into a single stream under the same hashtag. For example, on the photo-sharing service Instagram™, the hashtag "#bluesky" allows users to find all the posts that have been tagged using that hashtag.

With reference generally to method 100, the method 100 includes a technique for generating and managing contextual hashtags for a given content or cohort of contents. The invention may receive content from one or more content sources (e.g., a Book from Amazon.com®, a movie from Netflix®), identify a set of contextual indicators (e.g., related to geospatial context, style, temporal context, educational context, social context, etc.) for the content, understanding a desired outcome of a user or business (e.g., build a community, boost authority and credibility of a business, etc.) related to the content, generate a set of hashtags for the content using the set of contextual indicators and the desired outcome of a user or business, and select and present a subset of the hashtags along with the content to the entity on the entity device.

A content "C" may be, for example, a book (i.e., a link of a book), an image, an audio, video (e.g., movie, speech, etc.), etc.

The method 100 may first create a hashtag database(s) (i.e., a contextualized hashtag database) by collecting and analyzing historical posts corresponding to contents across one or more social media networks or platforms such as Twitter™, Instagram™, Facebook™, LinkedIn™, etc. The method of creating hashtag databases further, for each hashtag, identifies the hashtag as a "supplied hashtag" by an entity (e.g., person, business, AI agent, autonomous agent, robot, etc.) or "recommended hashtag" by recommender techniques.

The method 100 may also compute a popularity score and an engagement level for each post associated with a content (e.g., number of likes, number of retweets, number of comments, reactions to the posts, number of the post shared, audience size, audience profile, reach and engagement, traffic, etc.) and by using predicted audience growth for the post based on observed or current popularity of the post.

Using the historical data and the computed popularity scores and engagement levels, the method 100 further identifies one or more contextual indicators associated with each historical post/content using natural language processing. Examples of contextual indicators may be related to geospatial context (e.g., location), style (e.g., reading style, character style), temporal context (e.g., day-time-reading, night-time-listening/watching), educational context, social context, theme/story, etc. The identified contextual indicators I=$\{i_0, i_1, \ldots, i_m\}$ from historical data are stored in the contextualized hashtag database.

The method 100 further includes identifying a set of contextual indicators for a new content item "C". In one embodiment, given a new content "C", the method trains a machine learning model (e.g., neural-symbolic network, random forest method, etc.) to classify the content "C" based on the collection of the identified contextual indicators "I". After the content is classified, the method extracts the "Q" most important contextual features ($i_j$) this will be the subset to use. A pseudo algorithm for this can include:
  (1) Randomly select k features from total m features from collection 1 (Where k<m);
  (2) Among the k features, calculate the node d using the best split point;
  (3) Split the node into daughter nodes using the best split; and
  (4) Repeat 1 to 3 steps until j number of nodes has been reached; and
  (5) Build forest by repeating steps 1 to 4 for w number times to create w number of trees (size of the forest).

After, the algorithm is used to classify the content "C" as follows:
  (1) Takes the test features from I and use the rules of each randomly created decision tree to predict the outcome content C;
  (2) Calculate the votes for each predicted C how many trees predicted the same C);
  (3) Consider the high voted predicted C as the final prediction from the random forest algorithm; and
  (4) Extract the Q most important features based on, for example, Gini Importance. (The higher the value, the more important the feature).

And, the algorithm includes the Output: Subset $I_s \subseteq I$ with most important $i_j$.

The invention further includes understanding a user-or an entity-desired outcome. In one embodiment, an entity-desired outcome can be measured, categorized and presented to the user as a categorization of the quantity and nature of the engagement predicted for a post about the content "C" within a respective hashtag or a collection of hashtags, predefined according to the limitations of each platform of submission. If necessary, the user can be provided on a graphical user interface (GUI) a list of predefined desired outcomes and can select his desired outcomes (or his company-desired outcomes) from the list.

In one embodiment, examples of predefined desired outcomes may include, for example, industry-specific (e.g., building a community, boost authority, credibility of a business, etc.), location specific (e.g., to increase search, remove a significant amount of competition, etc.), trending-specific (e.g., to attract people that were previously out of reach, show that you know your audience, etc.), or custom hashtag (e.g., to drive awareness of a given business, show creativity of a business). In another embodiment, the invention may learn the intent of the desired outcomes from historical data, post/content characteristics, etc.

For example, if the task is to build a Twitter™ community around a new book, the following steps may apply:

(1) Quantitative Twitter engagement is measured as the number of retweets, likes and comments that is driven by the post about the content (e.g., a book);

(2) The nature of Twitter engagement is measured using free-text analytics of the different comments that exist in response to a post.).

This process can be extended to all social media platforms of engagement, applying similar engagement metrics using quantitative measurements and analysis of free-text across various hashtags.

Similar to the method of identifying a set of contextual indicators, the invention adds as an input profile information about the user or business, the content "C" and the target classes here are a set of outputs $O=\{o_1, o_2, \ldots, o_n\}$. In this case, the invention does not need to calculate importance but to keep the predicted $o_j$.

The invention further includes generating a set of hashtags for a given content. In one embodiment, the method may take enriched embedding that contains $I_s$, $O_j$, tokens corresponding to the post publication as input. The method then trains a machine learning model (e.g., Seq2Seq model shown exemplarily in FIG. 2) that contains an encoder and a decoder with an attention mechanism. The encoder reads the enriched embedding with context indicators $I_s$, desired outcome $O_j$, and tokens from the publication $P=(p_1, p_2, \ldots, p_n)$ and transforms it to a hidden state. On the other hand, the decoder takes these hidden states as the context inputs and generates a set of hashtags $H=(h_1, h_2, \ldots, h_m)$, where n represents the number of tokens of the post publication P and m the number of generated hashtags.

For example, in one embodiment, if the task (i.e., the intended outcome "O") is to build a Twitter™ community around a new book, the following steps may apply:

(1) Given a user "U", similar users "U'" are defined as those entities that have a similar profile, etc. (related to posted content, set of interests, bio, number of followers, engagement in hashtag communities, etc.).

(2) Given a pre-constructed tweet from "U", with content "C", an NLP model or pre-existing module for automatic hashtagging may generate a set of generic high-throughput and niche low-throughput hashtags that are related to "C". These hashtags may be generated by using a text summarization text-to-tag technique, word vector embedding and scoring of (cosine) similarity to achieve tag-to-tag translation, and/or identification of hashtags that are present for a set of similar content posts "C"' (also defined by word similarity scoring).

(3) An automated analysis is conducted for a set of similar content posts "C"', that are present within a set of generated hashtags and have been posted by "U'". By analyzing and aggregating the freetext analytical features (e.g. emotional response, keywords, concepts, entities, relations, sentiment, semantic roles, metadata, etc.) of the comments for "C"' given "U'", disparate trends may be identified across different hashtags, indicative of communities that may engage differently with similar content.

(4) These trends may be presented to "U" as the predicted engagement (quantity and nature of retweets, likes, comments) of "C", as a subset of the initial or seeded tags.

If community engagement around a book is the desired outcome "O", then "U" may select a combinatorial subset of generated hashtags that are searchable on from high exposure hashtags (e.g., #amreading, #books, etc.) to promote searchability, low exposure hashtags that are more likely to be presented as a top tweet (e.g., ##bookswithpictures, etc.), and hashtags that drive comments towards a desired outcome (e.g., for positive sentiment and encouraging emotional responses, i.e. #greatread, #mustread, etc.).

Similarly, this process can be extended to all social media platforms of engagement, applying similar engagement metrics using quantitative measurements and analysis of free-text across various hashtags.

The invention further includes selecting a subset of hashtags. In a further embodiment, selecting a subset of the hashtags using beam search algorithms that would allow to select the most suitable "W" hashtags on top of the decoder. The selection of the subset hashtags may further be refined based on user profile, time analysis (only use certain hashtags under specific condition/context such as a day of time, when a particular set of users view the post, a particular AI agent or hot view the post, etc.), user device characteristics, and user supplied specifications or rules. Thus, hashtags may be selected based on temporal aspects such as when one is posting, etc.

Figure 3:
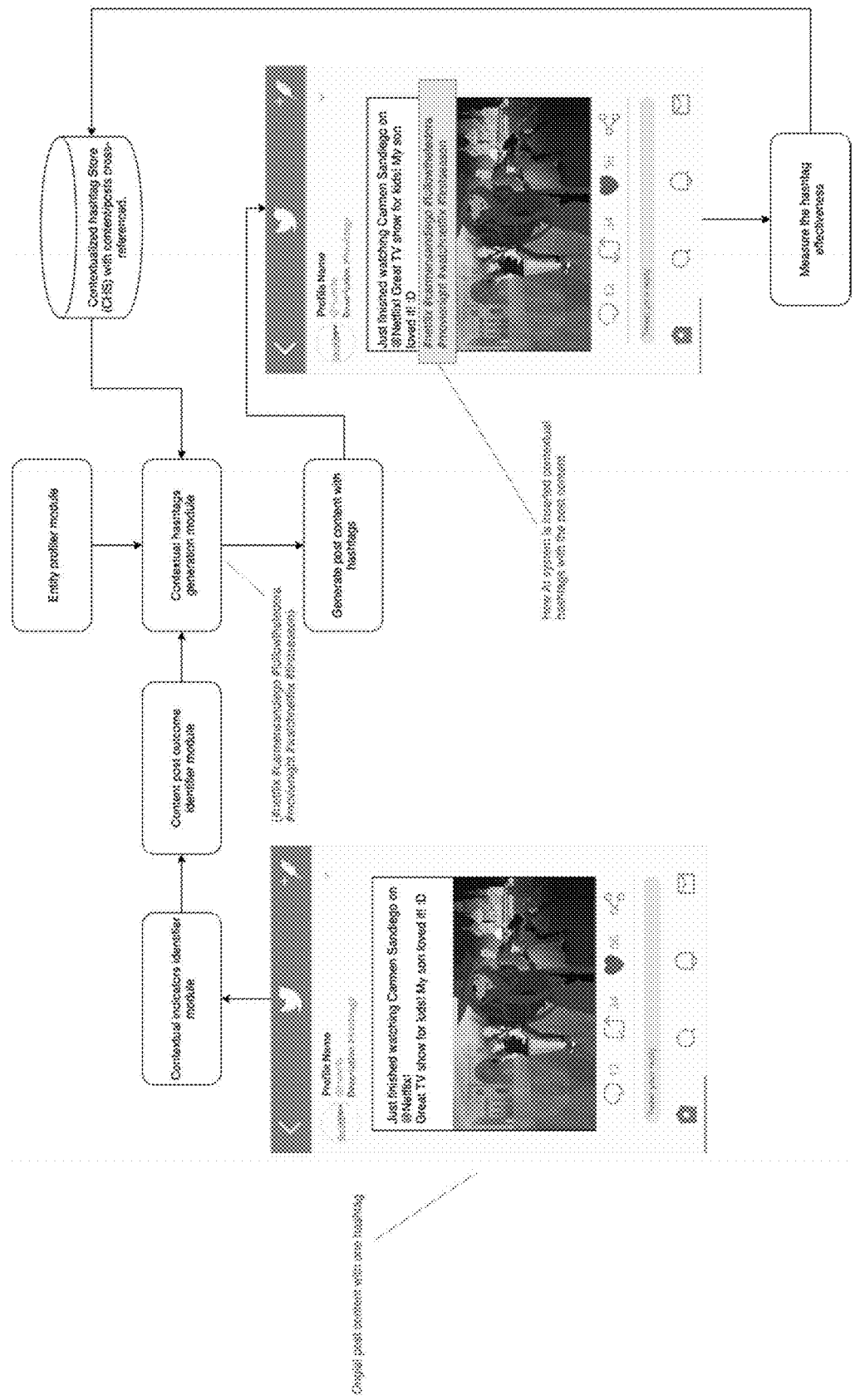
FIG. 3 exemplarily depicts a workflow of contextual hashtag generation and use according to an embodiment of the present invention.

As additional embodiment, the method 100 can be used to dynamically allowing a group hashtag post based on cohort analysis of users who involved or interacted or engaged with the given content (e.g., watching a movie, read/reading a book). Thus, the hashtags can be generated for different communities. Finally, the system may be configured with social network apps and/or content sources to provide the contextual hashtag generation service (e.g., as shown in FIG. 3). And, all engagements or interactions with content items may be performed on an opt-in basis. In FIG. 3 is depicted an illustrative implementation of the disclosed invention based on the social network Twitter. In one embodiment, it is depicted how the original post with one hashtag is used as an input to our system. The system extracts contextual indicators (using the Contextual indicators identifier module) and desired outcomes (using the Content post outcome identifier module), generates a set of possible hashtags (using the Contextualized hashtags generation module) and augment the original post with the new hashtags and inserted back to the social network Twitter graphical user interface (using the Contextualized hashtags generation and Generate post content with hashtags modules) and measures the effectiveness of the output (using the Measure the hashtag effectiveness module) to enrich the Contextualized Hashtag Store (CHS) database.

With reference back to FIG. 1, in step 101, content is received from one or more online sources (e.g., a book from Amazon.com®, a movie from Netflix®, a song/video from Youtube.com®).

In step 102, a set of contextual indicators are identified (e.g., related to geospatial context, style, temporal context, educational context, social context, etc.) for the content.

In step 103, an entity-desired outcome O is understood (e.g., build a community, boost authority and credibility of a business) related to the content.

In step 104, a set of hashtags is generated for the content using the set of contextual indicators while maximizing the entity-desired outcome O.

And, in step 105, a subset of the hashtags are selected and presented along with the content to the entity on the entity device.

Thereby, the invention allows a group hashtag post based on analyzing a cohort of users who involved or interacted or engaged with the given content item.

In another embodiment, the invention specifically targets to improve intended outcomes of a user or business. Thus, one aspect to the invention is the method of determining/understanding the desired outcome for a user or business (e.g., build a community, boost the authority and credibility of a business) related to the content item to be posted. And, the method includes identifying selected relevant contextual indicators for a content item to guide the generation of hashtags specific to the content item based on predicted maximization of the intended outcomes of the post as a function of (analysis of contextual indicators, analysis a user or entity-desired outcome, content analysis, content item characteristics, and so on), in an area that the user or business requires to enhance outcomes (e.g., avoid duplicating posts with randomly cycled hashtags), thus successfully drive exposure on overall personal or business social media strategy.

In short, the invention generates better (and more eye-catching) hashtags.

Moreover, in another embodiment, the method generates hashtags for the given content (e.g., book, video, audio, images) by applying various custom learning algorithms/models according to one or more contextual indicators pertaining to the desired outcome of the user or business. And, the invention specifically discloses a feature of allowing a group hashtag post based on analyzing a cohort of users who involved or interacted or engaged with the given content item.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network, in a distributed cloud computing environment, program modules may be located in both local and remote computer system storage media including memory storage circuits.

Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
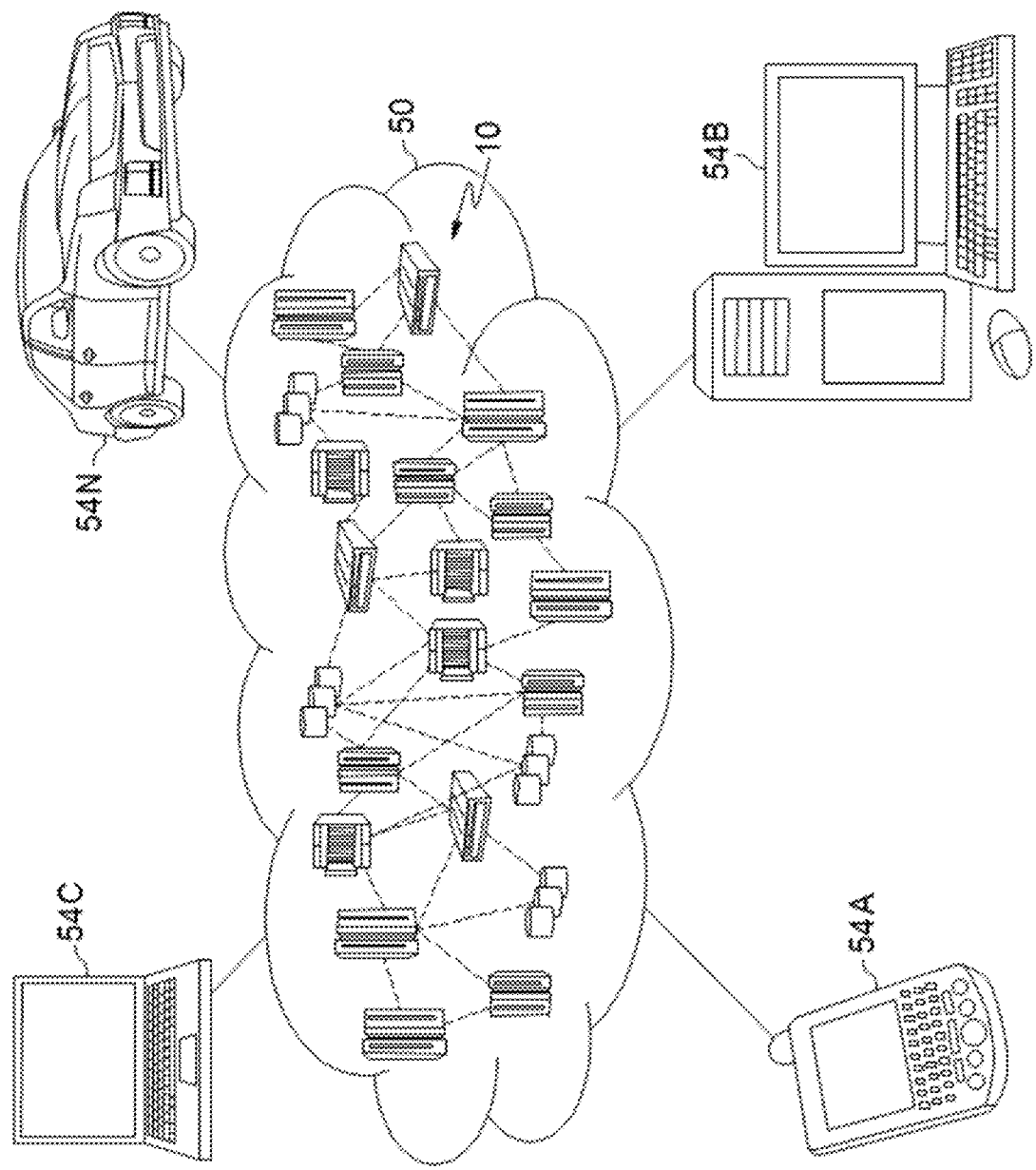
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
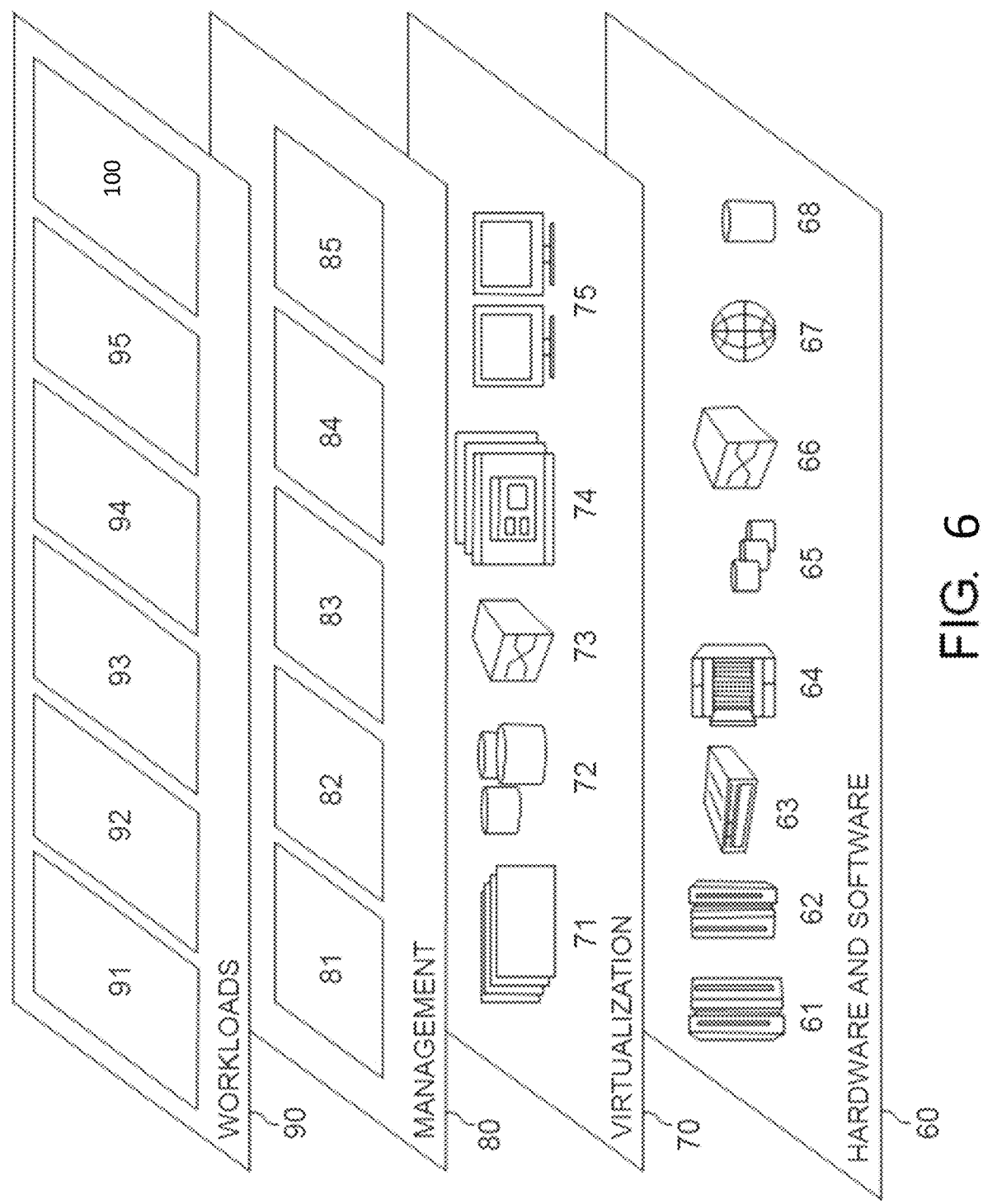
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual hashtag generation method 100 in accordance with the present invention.

The present invention may be a system, a method, and/or a computer program product at any possible technical detail level of integration. The computer program product nay include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality; and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented contextual hashtag generation method, the method comprising:
   receiving content from an online source;
   identifying a set of contextual indicators for the content;
   determining an entity-desired outcome for the content;
   generating a hashtag for the content using the set of contextual indicators while maximizing the entity-desired outcome; and
   selecting and presenting a subset of the hashtags along with the content to an entity on an entity device.

2. The computer-implemented method of claim 1, wherein allowing a group hashtag post based on analyzing a cohort of users according to the computed engagement with the given content item.

3. The method of claim 1, wherein an entity for the entity-desired outcome includes one of:
   a person;
   a business;
   an artificial intelligence (AI) agent;
   an autonomous agent; and
   a robot.

4. The method of claim 1, further comprising classifying a content item for the hashtag based on analysis of historical contextual indicators using a trained machine learning model.

5. The method of claim 1, wherein the contextual indicators include at least one of:
   a geospatial context;
   a style;
   a temporal context;
   an educational context; and
   a social context.

6. The method of claim 1, further comprising displaying a predicted outcome on the entity device of a post due to the generated hashtag.

7. The method of claim 6, wherein the predicted outcome is based on computing an engagement with the post.

8. A computer program product for contextual hashtag generation, the computer program product comprising a computer-readable storage medium having program instructions embodied therewith, the program instructions executable by a computer to cause the computer to perform:
   receiving content from an online source;
   identifying a set of contextual indicators for the content;
   determining an entity-desired outcome for the content;
   generating a hashtag for the content using the set of contextual indicators while maximizing the entity-desired outcome; and
   selecting and presenting a subset of the hashtags along with the content to an entity on an entity device.

9. The computer program product of claim 8, further comprising displaying a predicted outcome on the entity device of a post due to the generated hashtag.

10. The method of claim 9, wherein the predicted outcome is based on computing an engagement with the post.

11. The computer program product of claim 8, wherein an entity for the entity-desired outcome includes one of:
    a person;
    a business;
    an artificial intelligence (AI) agent;
    an autonomous agent; and
    a robot.

12. The computer program product of claim 8, further comprising classifying a content item for the hashtag based on analysis of historical contextual indicators using a trained machine learning model.

13. The computer program product of claim 8, wherein the contextual indicators include at least one of:
    a geospatial context;
    a style;
    a temporal context;
    an educational context; and
    a social context.

14. A contextual hashtag generation system, the system comprising:
    a processor; and
    a memory, the memory storing instructions to cause the processor to perform:
       receiving content from an online source;
       identifying a set of contextual indicators for the content;

determining an entity-desired outcome for the content; and generating a hashtag for the content using the set of contextual indicators while maximizing the entity-desired outcome; and selecting and presenting a subset of the hashtags along with the content to an entity on an entity device.

15. The system of claim 14, wherein an entity for the entity-desired outcome includes one of:

a person;
a business;
an artificial intelligence (AI) agent;
an autonomous agent; and
a robot.

16. The system of claim 14, further comprising classifying a content item for the hashtag based on analysis of historical contextual indicators using a trained machine learning model.

17. The system of claim 14, wherein allowing a group hashtag post based on analyzing a cohort of users according to the computed engagement with the given content item.

* * * * *